(12) United States Patent
Murai et al.

(10) Patent No.: US 11,077,481 B2
(45) Date of Patent: Aug. 3, 2021

(54) METHOD FOR MANUFACTURING RING-ROLLED PRODUCT

(71) Applicant: HITACHI METALS, LTD., Tokyo (JP)

(72) Inventors: Takuya Murai, Tokyo (JP); Takanori Matsui, Tokyo (JP); Yuji Ishiwari, Tokyo (JP); Tomoyoshi Kiwake, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 635 days.

(21) Appl. No.: 15/779,772

(22) PCT Filed: Dec. 1, 2016

(86) PCT No.: PCT/JP2016/085825
§ 371 (c)(1),
(2) Date: May 29, 2018

(87) PCT Pub. No.: WO2017/094864
PCT Pub. Date: Jun. 8, 2017

(65) Prior Publication Data
US 2020/0306818 A1 Oct. 1, 2020

(30) Foreign Application Priority Data
Dec. 3, 2015 (JP) .............................. JP2015-236714

(51) Int. Cl.
*B21H 1/06* (2006.01)
*B21B 45/00* (2006.01)

(52) U.S. Cl.
CPC ............. *B21H 1/06* (2013.01); *B21B 45/004* (2013.01)

(58) Field of Classification Search
CPC ... B21H 1/06; B21H 1/10; B21H 1/12; B21H 1/22; B21D 53/16; C21D 1/42
(Continued)

(56) References Cited

U.S. PATENT DOCUMENTS 3,859,830 A * 1/1975 Jeuken ..................... B21H 1/06
72/8.3
4,126,029 A 11/1978 Mathur
(Continued)

FOREIGN PATENT DOCUMENTS

JP 53-87970 A 8/1978
JP 59-212107 A 1/1984
(Continued)

OTHER PUBLICATIONS

KOBAYASHI, Translation of JP-2008025780 (Year: 2008).*
(Continued)

*Primary Examiner* — Adam J Eiseman
*Assistant Examiner* — Bobby Yeonjin Kim
(74) *Attorney, Agent, or Firm* — Myers Bigel, P.A.

(57) ABSTRACT

A method for manufacturing a ring-rolled product forms the ring-rolled product from a ring material by using a mandrel roll and a main roll. The mandrel roll and the main roll are configured so as to contact inner and outer circumferential surfaces of the ring material, respectively, and are configured so as to press the ring material in a radial direction thereof in a state in which the ring material is rotated in a circumferential direction thereof. The method includes a step of rolling the ring material that includes an operation of induction-heating the main roll by at least one induction heating element and rolling the ring material between the mandrel roll and the main roll, which is induction-heated.

5 Claims, 4 Drawing Sheets

(58) Field of Classification Search
USPC .............. 72/105–107, 110, 69, 342.7, 342.8; 219/602, 606
See application file for complete search history.

(56) References Cited

U.S. PATENT DOCUMENTS

| | | | | |
|---|---|---|---|---|
| 4,150,279 | A * | 4/1979 | Metcalfe | B21B 45/004 219/118 |
| 4,830,683 | A * | 5/1989 | Ferguson | C22F 1/00 148/648 |
| 6,498,324 | B2 * | 12/2002 | Yamamoto | B21B 27/106 148/567 |
| 2012/0279268 | A1 * | 11/2012 | Loveless | B21B 5/00 72/69 |
| 2014/0157851 | A1 * | 6/2014 | Takizawa | B21K 1/28 72/206 |

FOREIGN PATENT DOCUMENTS

| JP | 1-237036 | A | | 9/1989 |
|---|---|---|---|---|
| JP | 5-329569 | A | | 12/1993 |
| JP | 05329569 | A | * | 12/1993 |
| JP | 6-198375 | A | | 7/1994 |
| JP | 06198375 | A | * | 7/1994 |
| JP | 2008-25780 | A | | 2/2008 |
| JP | 2008025780 | A | * | 2/2008 |

OTHER PUBLICATIONS

ISHIHARA, Translation of JP-05329569-A (JPH05329569) (Year: 1993).*
MIKAMI, Translation of JP-06198375-A (JPH06198375) (Year: 1994).*
International Search Report with English language translation, International Application No. PCT/JP2016/085825, dated Jan. 24, 2017, 5 pp.
Written Opinion, International Application No. PCT/JP2016/085825, dated Jan. 24, 2017, 3 pp.
International Search Report with English language translation, International Application No. PCT/JP2016/085824, dated Jan. 24, 2017, 5 pp.
Written Opinion, International Application No. PCT/JP2016/085824, dated Jan. 24, 2017, 4 pp.

* cited by examiner

METHOD FOR MANUFACTURING RING-ROLLED PRODUCT

RELATED APPLICATIONS

This application is a 35 U.S.C. § 371 national stage application of PCT Application No. PCT/JP2016/085825, filed on Dec. 1, 2016, which itself claims priority from Japanese Patent Application No. 2015-236714, filed on Dec. 3, 2015, the contents of both of which are incorporated herein by reference in their entireties. The above-referenced PCT International Application was published as International Publication No. WO 2017/094864 A1 on Jun. 8, 2017.

TECHNICAL FIELD

The present invention relates to a method for manufacturing a ring-rolled product, the method forming a ring-rolled product from a ring material by using rolling, the rolling including a step of rolling the ring material from both inner and outer circumferential sides thereof, between a mandrel roll and a main roll in a state of rotating the ring material in a circumferential direction thereof.

BACKGROUND ART

In a gear, a rotary element of a rotation mechanism, or the like which is used in various industrial fields, a ring-shaped component (hereinafter, referred to as "ring component") is used. In many cases, the ring component is manufactured by a rolling ring-shaped rolled product (hereinafter, referred to as "ring-rolled product"). The ring-rolled product is manufactured by applying ring-rolling to a ring-shaped material (hereinafter, referred to as a "ring material"). In the ring rolling, a rolling device such as a ring-rolling mill is used. In a typical ring rolling, inner and outer circumferential surfaces of the ring material are rolled respectively by a mandrel roll and a main roll while the ring material, which is heated in advance, is rotated in a circumferential direction thereof, and furthermore, one or both of the mandrel roll and the main roll is or are moved in a radial direction with a center of the ring material in the radial direction as a reference so that the ring material is deformed so as to enlarge a diameter thereof.

However, when the temperature of the ring material which is heated in advance, is decreased during ring rolling, the quality such as the dimensional accuracy of the ring-rolled product which is to be manufactured, may be reduced. In particular, this is a problem when manufacturing a ring component which requires the strict dimensional control, such as turbine disks for use in a gas turbine, a steam turbine, and a jet engine of an aircraft. Therefore, a ring material is heated at the time of ring rolling, and it is a common method for heating the ring material during ring rolling for an induction heating coil or the like to induction-heat the ring material.

As an example of the ring rolling, there is ring rolling in which a ring rolling mill includes: a mandrel roll and a main roll (a middle roll and a main roll) which respectively roll inner and outer circumferential surfaces of the ring material; a pair of axial rolls (edge rolls) which presses both end surfaces of the ring material in an axial direction thereof; and an induction heating coil (heating electrode) which surrounds an entire circumference of a cross-section of the ring material, and in a region immediately after the ring material passes through the axial rolls, an induction heating coil induction-heats the ring material (for example, refer to Patent Literature 1).

As another example of ring rolling, there is ring rolling in which a ring rolling mill (a forming device for a metal ring product) includes: a mandrel roll and a main roll (inner circumferential and outer circumferential forming rolls) which respectively roll inner and outer circumferential surfaces of a ring material (a ring element); and an induction heating coil which is formed into a U-shape so as to face an entirety of the outer circumferential surface and both end surfaces of the ring material in an axial direction thereof, and an induction heating coil induction-heats the ring material in an entire region along the ring material except for vicinities of the mandrel roll and the main roll (for example, refer to Patent Literature 2).

As further another example of ring rolling, there is ring rolling in which a ring rolling mill (a rolling forging device) includes: a mandrel roll and a main roll (a free play roll and a drive roll) which respectively roll the inner and outer circumferential surfaces of the ring material (the ring element); a pair of axial rolls which presses both end surfaces of the ring material in an axial direction thereof; a magnetic core which is formed into a C-shape so as to face an outer circumferential surface of the ring material and both end surfaces thereof in the axial direction; and an induction heating element which has an induction heating coil (solenoid coil) being wound on the magnetic core, and in a region immediately after the ring material passes through the axial rolls, the induction heating coil induction-heats the ring material (For example, refer to Patent Literature 3).

CITATION LIST

Patent Literatures

[Patent Literature 1] Japanese Patent Application Publication No. H01-237036
[Patent Literature 2] Japanese Patent Application Publication No. H05-329569
[Patent Literature 3] Specification of U. S. Patent Application Publication No. 2012/0279268

SUMMARY OF INVENTION

Technical Problem

However, a ring material is deformed according to advancing ring rolling so that a distance between the induction heating coil and the ring material is changed. Consequently, when the induction heating coil heats the ring material as in each of the above examples of the ring rolling, it is difficult to control the distance between the induction heating coil and the ring material, and it is difficult to control the temperature distribution of the ring material within the appropriate temperature range. However, there is a case in which a die of a main roll or the like may be heated in advance, by a heating furnace, a gas burner, and/or the like. However, in this case, it is difficult to heat the dies sufficiently, and furthermore, the ring material contacts the dies which are not sufficiently heated during ring rolling, so that the temperature of the ring material may be decreased by heat transfer.

Furthermore, in the ring rolling, the temperature of the outer circumferential side region of the ring material tends to be lower than the temperature of the inner circumferential side region. However, in the above example of the ring rolling, the entire circumference of the cross-section of the ring material is merely induction-heated so that the difference between the inner and outer circumferential temperatures of the ring material remains, and it may occur that during the ring rolling, the temperature distribution of the ring material in the radial direction cannot be controlled within the appropriate temperature range. In particular, in the structure in which the induction heating coil surrounds the entire circumference of the cross-section of the ring material, it is more difficult to control within this temperature range when the distance between the induction heating coil and the ring material which deforms during ring rolling, is changed. Furthermore, in this structure, in a case of rolling the ring material so as to enlarge the ring material during ring rolling, the final rolled shape of the ring material and the reduction thereof are restricted depending on a shape, a size, and/or the like in the induction heating coil which surrounds the entire circumference of the cross-section of the ring material.

In the above, another example of the ring rolling and the above further another example thereof, both the inner and outer circumferential sides of the ring material are induction-heated so that the difference between the inner and outer circumferential temperatures of the ring material remains, and it may occur that the temperature distribution of the ring material in the radial direction cannot be controlled within the appropriate temperature range. This matter reduces the dimensional accuracy of the ring-rolled product which is to be manufactured, the matter causes the cracking in the ring material, or the matter makes it impossible to obtain the desired plastic strain, and therefore, the matter is not preferable. Furthermore, in the ring rolling, it tends to be difficult to control the temperature distribution of the ring material in the axial direction within the appropriate temperature range. Consequently, it is desired to efficiently control the temperature distribution of the ring material in the ring rolling within the appropriate temperature range.

In addition, when the ring material is pressed between the pair of axial rolls from both sides in the axial direction thereof, the temperature distribution of the ring material is irregular due to the influence of the friction heat which occurs between the axial rolls and the ring material, the influence of the heat transfer to the axial rolls from the ring material, the influence of the processing heat of the ring material, and/or the like. Consequently, it is difficult to control the temperature of the ring material in the region immediately after the ring material passes through the axial rolls. However, in the above example of the ring rolling and the further another example thereof, the ring material is induction-heated in the region immediately after the ring material passes through the axial rolls. As a result, the temperature distribution of the ring material cannot be controlled within the appropriate temperature range. Furthermore, in the ring rolling, there is a case in which the ring material being rotated, may be held by a guide roll and/or the like in the vicinity of the main roll. In this case, it may occur that the temperature distribution of the ring material cannot be controlled within the appropriate temperature range, according to the influence of the heat transfer from the ring material to the guide roll and/or the like, although not as much as the influence of the axial rolls.

The present invention is made in the view of the above-described circumstances, and an object of the present invention is to provide a method for manufacturing a ring-rolled product which can efficiently control the temperature distribution of the ring material in ring rolling within the appropriate temperature range, and can efficiently enhance the quality of a ring-rolled product which is manufactured by using this ring rolling as a result.

Solution to Problem

To solve the problem, regarding a method for manufacturing a ring-rolled product according to one aspect of the present invention, a method for manufacturing a ring-rolled product, the method forming a ring-rolled product from a ring material by using a mandrel roll and a main roll, the mandrel roll and the main roll being configured so as to contact inner and outer circumferential surfaces of the ring material respectively in a state in which the ring material is rotated in a circumferential direction thereof, the mandrel roll and the main roll being configured so as to press the ring material in a radial direction thereof, includes a step of rolling the ring material, this step including an operation of induction-heating the main roll by at least one induction heating element, and rolling the ring material between the mandrel roll, and the main roll which is induction-heated.

Advantageous Effects of Invention

In the method for manufacturing a ring-rolled product according to the present invention, the temperature distribution of the ring material in the ring rolling can be efficiently controlled within the appropriate temperature range, and as a result, the quality of the ring-rolled product which is manufactured by using the ring rolling, can be efficiently enhanced as a result.

DESCRIPTION OF EMBODIMENTS

Methods for manufacturing substantially ring-shaped rolled products (hereinafter, referred to as "ring-rolled products") according to First and Second Embodiments of the present invention will be described hereinafter with reference to FIGS. 1 to 7.

Note that the ring-rolled product is used to manufacture a component (hereinafter, referred to as "ring component") in a substantially ring shape. Although the following is only an example, the ring component can be a gear, a rotary element of a rotation mechanism, or the like which is used in various industrial fields, and the ring component may preferably be a component which requires strict dimension management, in particular, a turbine disk for use in a gas turbine, a steam turbine, a jet engine of an aircraft, or the like. As an example, a diameter of an outer circumference of the ring-rolled product may preferably be from approximately 600 mm to approximately 2000 mm; however, the present invention is not limited to this, and it is possible to make the diameters of the outer circumferences of the ring-rolled products smaller than approximately 600 mm and larger than approximately 2000 mm according to the ring component which is manufactured by using the ring-rolled product.

Furthermore, the ring-rolled product is formed by applying ring rolling to a material (hereinafter, referred to as a "ring material") formed substantially in a ring shape. The ring material can be manufactured by using a metal material which is excellent in the high temperature strength, the high temperature tenacity, and/or the like. For example, the ring material can be manufactured by using a metal material selected from an Ni-based alloy, an Fe-based alloy, a Co-based alloy, a Ti-based alloy, and/or the like which are/is excellent in the high temperature strength, the high temperature tenacity, and/or the like.

First Embodiment

A method for manufacturing a ring-rolled product according to a First Embodiment of the present invention will be described hereinafter.

<Rolling Device>

Figure 1:
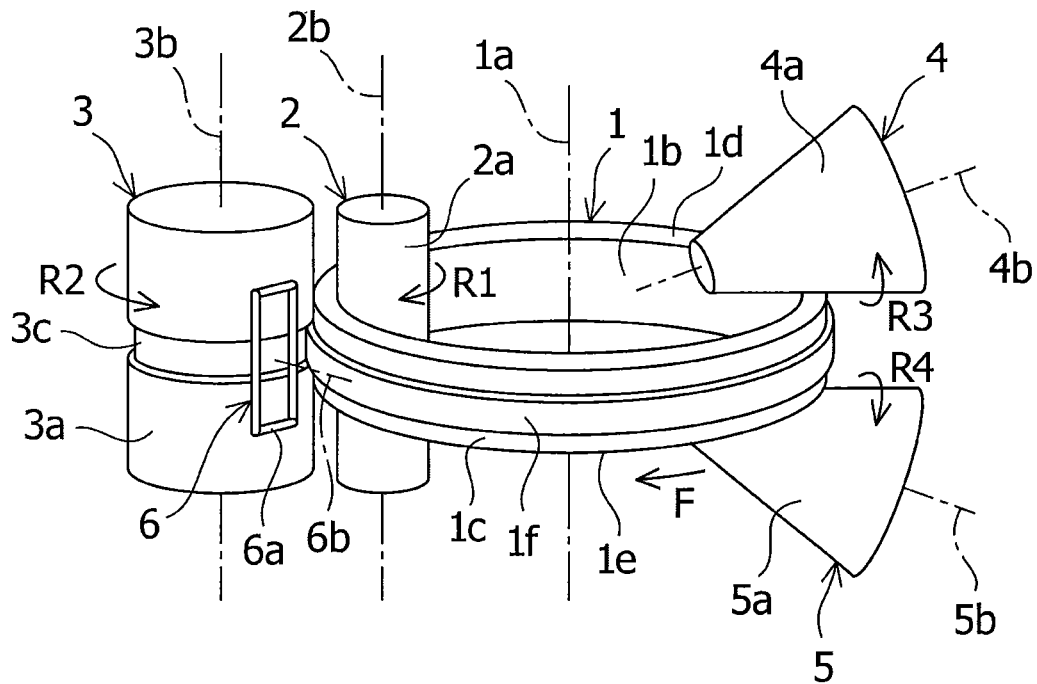
FIG. 1 is a perspective view schematically showing a rolling device used in a First Embodiment of the present invention.
Figure 2:
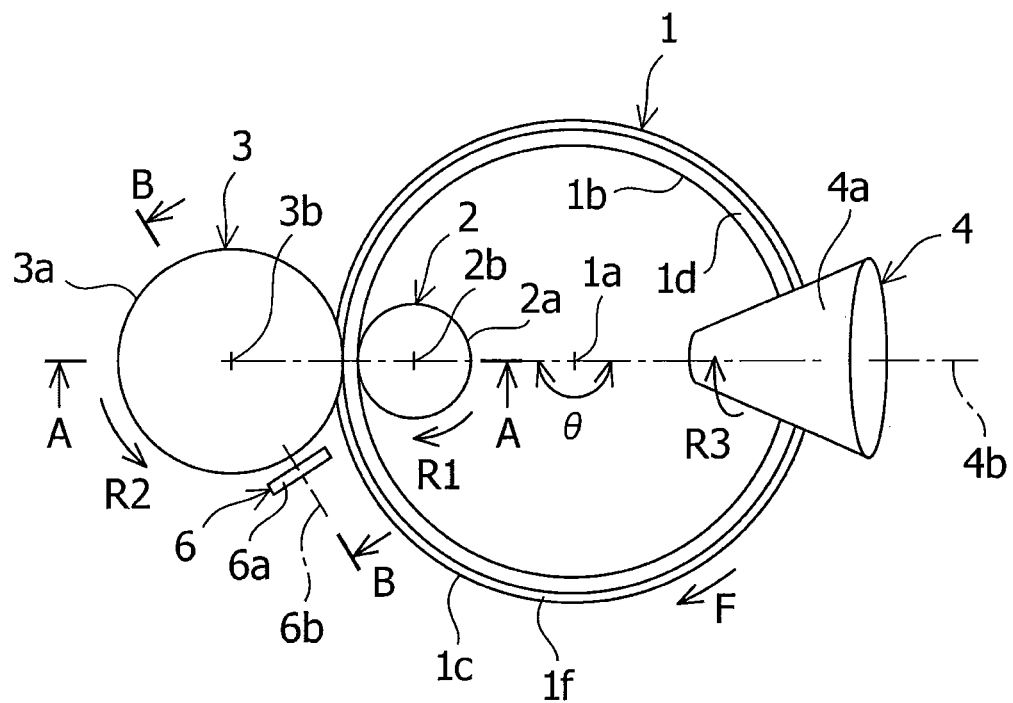
FIG. 2 is a plan view schematically showing the rolling device used in the First Embodiment of the present invention.
Figure 3:
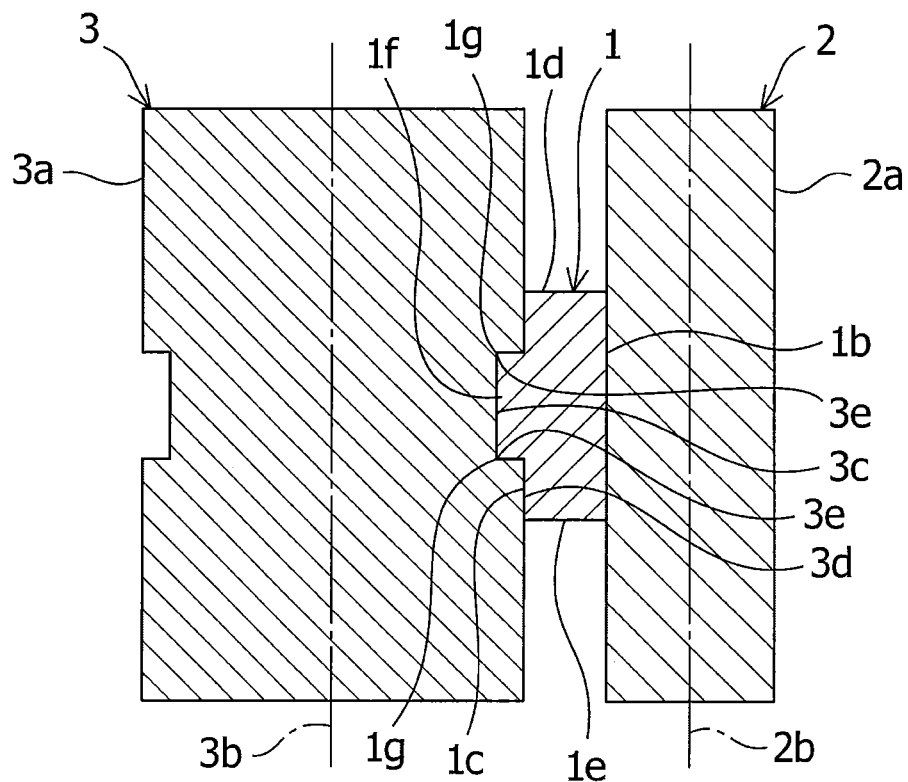
FIG. 3 is a diagram schematically showing a cross-section of a ring material and a main roll in the First Embodiment of the present invention, which is cut along line A-A in FIG. 2.

First, an outline of a rolling device, which is used in ring rolling, will be described. As shown in FIGS. 1 to 3, the rolling device is configured such that a ring material 1, which is formed to be substantially-rotationally symmetrical with an axis 1a as a reference, can be fitted thereto. This rolling device includes: a mandrel roll 2 and a main roll 3 which are configured so as to be respectively in contact with inner and outer circumferential surfaces 1b and 1c of the ring material 1 and are configured so as to press the ring material 1 in a radial direction thereof (hereinafter, referred to as a "ring radial direction"); and a pair of axial rolls 4 and 5 which are configured so as to be in contact with both end surfaces 1d and 1e in a direction of the axis 1a (hereinafter, referred to as a "ring axial direction") in the ring material 1 and are configured so as to press the ring material 1 in the ring axial direction. The rolling device may be also configured so as to not include the pair of axial rolls 4 and 5. Furthermore, the rolling device includes an induction heating element 6 which is configured so as to induction-heat the main roll 3.

<Mandrel Roll and Main Roll>

As shown in FIGS. 1 and 2, the mandrel roll 2 has a circumferential surface 2a which is configured so as to be contactable to the inner circumferential surface 1b of the ring material 1. The main roll 3 has a circumferential surface 3a which is configured so as to be contactable to the outer circumferential surface 1c of the ring material 1. These circumferential surfaces 2a and 3a are substantially rotationally symmetrical with rotation axes 2b and 3b as references respectively. The mandrel roll 2 and main roll 3 are configured so as to be rotatable around the rotation axes 2b and 3b respectively. One or both of the mandrel roll 2 and the main roll 3 may be preferably configured so as to be rotationally drivable by a drive mechanism (not shown). The mandrel roll 2 and the main roll 3 may be preferably configured such that rotational speeds thereof are controllable as necessary. In particular, in the view of circumstances in which it is difficult for a space formed at an inner circumferential side of the ring material 1 to ensure a sufficient disposition space for the drive mechanism as compared with a space formed on an outer circumferential side of the ring material 1, the main roll 3 in between the mandrel roll 2 and the main roll 3 may preferably be configured so as to be rotationally drivable.

Note that "the inner circumferential side of the ring material 1" is defined as a range including the inner circumferential side region of the ring material 1 having a surface of the ring material 1 which contacts the mandrel roll 2. Note that "the outer circumferential side of the ring material 1" is defined as a range including the outer circumferential side region of the ring material 1 having the surface of the ring material 1 which contacts the main roll 3 and the pair of axial rolls 4 and 5, and is located closer to the outer circumference of the ring material 1 relative to the inner circumferential side region of the ring material 1.

The circumferential surfaces 2a and 3a of the mandrel roll 2 and the main roll 3 have shapes corresponding to the shape of the ring-rolled product which is to be manufactured. In FIGS. 1 to 3, the ring material 1 is formed so as to have one protruded portion 1f protruding from the outer circumferential surface 1c and extending along a circumferential direction of the ring material 1 (hereinafter, referred to as a "ring circumferential direction"). The circumferential surface 3a of the main roll 3 is formed so as to have one recessed portion 3c corresponding to the one protruded portion 1f and extending along the circumferential direction of the main roll 3.

However, the outer circumferential surface of the ring material is not limited to this, and it may be formed so as to be substantially flat, it may be formed so as to have a portion with a diameter thereof which is changed along the ring axial direction, or it may be formed so as to have at least one of: one or more protruded portions; and one or more recessed portions. The circumferential surface of the main roll may be formed so as to correspond to this outer circumferential surface of the ring material. The inner circumferential surface of the ring material can be also formed in the same manner as this outer circumferential surface of the ring material, and the circumferential surface of the mandrel roll can be formed so as to correspond to this inner circumferential surface of the ring material.

Referring to FIGS. 1 and 2 again, the mandrel roll 2 and the main roll 3 are configured so as to be movable in the ring radial direction. The ring material 1 is rolled between the circumferential surfaces 2a and 3a of the mandrel roll 2 and the main roll 3. The rolling device is configured such that the ring material 1 can rotate in the ring circumferential direction in connection with rotating the mandrel roll 2 and the main roll 3. Note that in the method for manufacturing the ring-rolled product, which will be described later, a case in which the ring material 1 rotates to one side (shown by an arrow F) of the ring circumferential direction in connection with rotating the mandrel roll 2 to one side (shown by an arrow R1) of a rotation direction thereof and rotating the main roll 3 to one side (shown by an arrow R2) of a rotation direction thereof, will be described. Furthermore, as an example, the main roll 3 may preferably be formed in such a size that it is difficult to heat the main roll 3 by a heating furnace, a gas burner, and/or the like. In particular, a diameter of the circumferential surface 3a of the main roll 3 may preferably be approximately 1000 mm or more. However, the present invention is not limited to this, and as long as the main roll 3 can be properly induction-heated, as will be described later, the diameter of the circumferential surface of the main roll can be made smaller than approximately 1000 mm.

<Pair of Axial Rolls>

As shown in FIGS. 1 and 2, the pair of axial rolls 4 and 5 is disposed so as to be apart from the main roll 3 in the ring circumferential direction. The pair of axial rolls 4 and 5 can be disposed so as to be apart from the main roll 3 with a space of an angle θ around the axis 1a of the ring material 1. Typically, the angle θ may preferably be approximately 180 degrees, in other words, the pair of axial rolls 4 and 5 may preferably be disposed so as to be apart from the main roll 3 with a space in the ring circumferential direction while being opposed to the main roll 3 in the ring radial direction. However, the angle θ is not limited to this, as long as a high-quality ring-rolled product can be manufactured, the angle θ may be set within a range greater than 0 degrees and less than approximately 360 degrees, the angle θ may be set within a range from approximately 90 degrees to approximately 270 degrees, or the angle θ may be set within a range from approximately 135 degrees to approximately 225 degrees.

The pair of axial rolls 4 and 5 respectively has circumferential surfaces 4a and 5a which are respectively configured so as to be contactable to both end surfaces 1d and 1e in the ring axial direction. These circumferential surfaces 4a and 5a are substantially-rotationally symmetrical with rotation axes 4b and 5b as references respectively. The pair of axial rolls 4 and 5 is respectively configured so as to be rotatable around the rotation axes 4b and 5b. One or both of the pair of axial rolls 4 and 5 may preferably be configured so as to be rotationally drivable by a drive mechanism. The pair of axial rolls 4 and 5 may also preferably be configured such that rotational speeds thereof are controllable as necessary.

Each of the circumferential surfaces 4a and 5a of the paired axial rolls 4 and 5 has a shape corresponding to a shape of the ring-rolled product which is to be manufactured. The ring material 1 is rolled between the circumferential surfaces 4a and 5a of the pair of axial rolls 4 and 5. The rolling device is configured such that the ring material 1 can rotate in the ring circumferential direction in connection with rotating the pair of axial rolls 4 and 5. Note that in the method for manufacturing the ring-rolled product, which will be described later, a case in which the ring material 1 rotates to one side (shown by the arrow F) of the ring circumferential direction in connection with rotating the axial roll 4 on one side to one side (shown by an arrow R3) of a rotation direction thereof and rotating the axial roll 5 on the other side to one side (shown by an arrow R4) of a rotation direction thereof, will be described.

<Induction Heating Element>

As shown in FIGS. 1 to 5, the induction heating element 6 of the rolling device includes an induction heating coil 6a having a winding wire which is wound so as to make at least one turn. The induction heating element 6 is configured so as to generate the line of the magnetic flux for induction heating by passing an alternating current to the winding wire of the induction heating coil 6a.

As shown in FIGS. 1 and 2, the induction heating element 6 is disposed around the circumferential surface 3a of the main roll 3. More specifically, the induction heating element 6 may preferably be disposed in a region (hereinafter, referred to as "a region immediately before inner and outer circumferential rolling") which is adjacent to inner and outer circumferential rolling region on the other side in the rotation direction of the main roll 3 relative to a region (hereinafter referred to as the "inner and outer circumferential rolling region") of rolling between the mandrel roll 2 and the main roll 3 around the circumferential surface 3a of the main roll 3. The region immediately before inner and outer circumferential rolling can be located toward the other side in the rotation direction of the main roll 3 from the inner and outer circumferential rolling region so as to be within a range of a length which is obtained by dividing an entire circumferential length of the main roll 3 into four.

However, the induction heating element is not limited to this, and it may be disposed around the circumferential surface of the main roll in other regions than the region immediately before inner and outer circumferential rolling. For example, the induction heating element may be disposed in a position where the induction heating element faces the inner and outer circumferential rolling region in the radial direction of the main roll, around the circumferential surface of the main roll.

Figure 4:
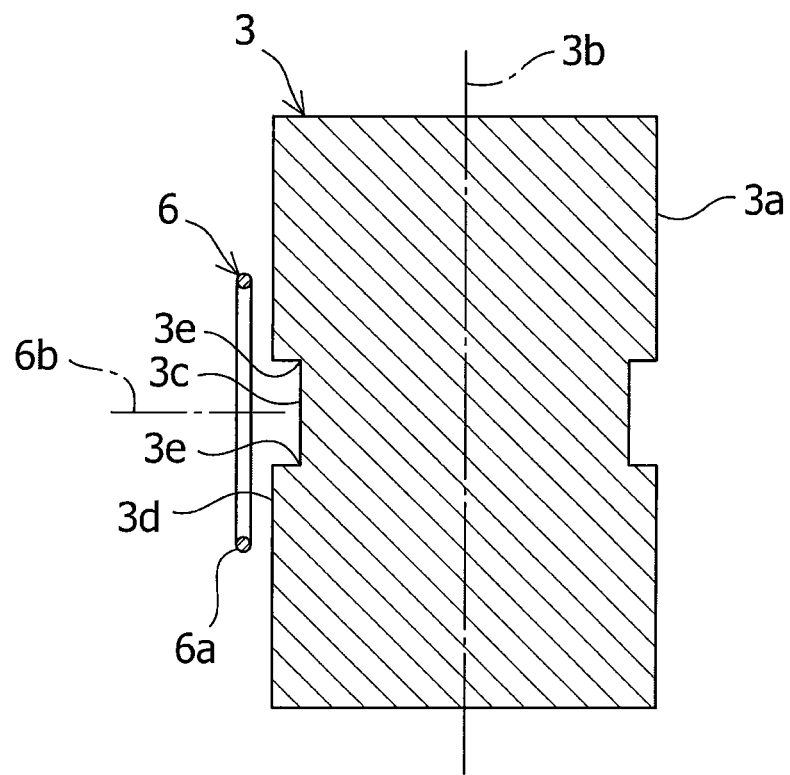
FIG. 4 is a diagram schematically showing a cross-section of the main roll and an induction heating coil in the First Embodiment of the present invention, which is cut along line B-B in FIG. 2.
Figure 5:
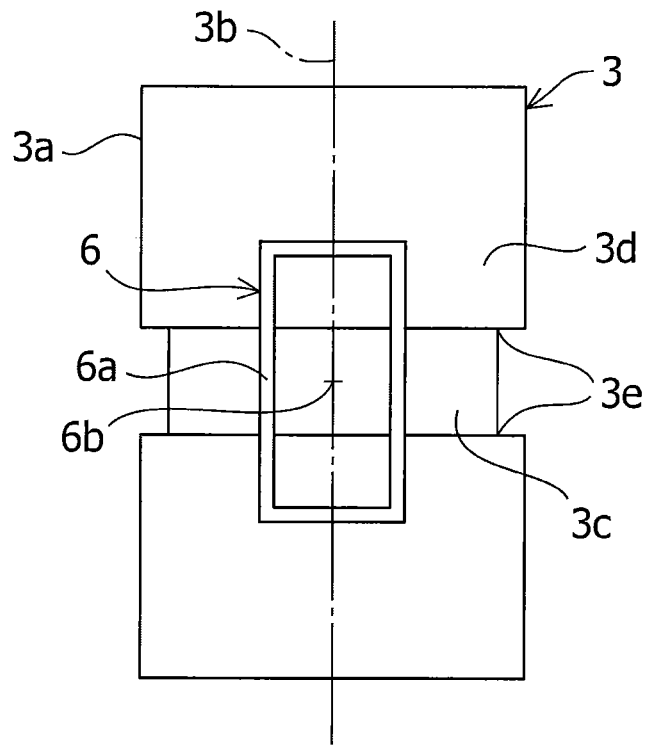
FIG. 5 is a front view schematically showing the main roll and the induction heating coil in the First Embodiment of the present invention.

As shown in FIGS. 2, 4, and 5, the induction heating coil 6a is disposed such that it is apart from the circumferential surface 3a of the main roll 3 in a radial direction of the main roll 3, and a direction of a winding axis 6b of the winding wire is directed to the circumferential surface 3a of the main roll 3. Furthermore, both end portions of the induction heating coil 6a in the ring axial direction thereof are respectively disposed so as to be separated in the ring axial direction from both end portions of an outer circumferential surface contact portion 3d of the circumferential surface 3a in the main roll 3, which contacts the outer circumferential surface 1c of the ring material 1, in the ring axial direction thereof. By the induction heating coil 6a, the entire outer circumferential surface contact portion 3d of the circumferential surface 3a of the main roll 3 can be induction-heated in the region immediately before inner and outer circumferential rolling, and furthermore, the outer circumferential surface 1c of the ring material 1 which contacts the outer circumferential surface contact portion 3d of the circumferential surface 3a of the main roll 3 which is induction-heated, can be heated in the inner and outer circumferential rolling region.

However, the present invention is not limited to this, and the rolling device may have a plurality of induction heating elements to facilitate the temperature control of the ring material more. Furthermore, if the entire outer circumferential surface contact portion of the circumferential surface of the main roll can be induction-heated in the ring axial direction, the direction of the winding axis of the induction heating coil may be directed to other spots than the outer circumferential surface of the main roll. If the entire outer circumferential surface contact portion of the circumferential surface of the main roll can be induction-heated in the ring axial direction, the induction heating element may have a magnetic core on which the induction heating coil is wound, and in this case, the outer circumferential surface contact portion is induction-heated on the line of the magnetic flux generated from the magnetic core.

In FIGS. 1 and 5, an outer perimeter portion of this induction heating coil 6a is formed into a substantially quadrangular shape when seen from the direction of the winding axis 6b. However, the outer perimeter portion of the induction heating coil is not limited to this, and it can also be formed into a substantially circular shape, a substantially elliptical shape, a substantially polygonal shape other than the substantially quadrangular shape, and/or the like when seen from the direction of the winding axis. Furthermore, the number of turns of the induction heating coil 6a may preferably be more than one as necessary for the density of the magnetic lines of the force in a range which enables production of coil.

<Method for Manufacturing Ring-Rolled Product>

Next, the method for manufacturing a ring-rolled product will be described. In this method for manufacturing, the aforementioned rolling device ring-rolls the ring material 1, which is heated in advance. At this time, the temperature of the ring material 1, which is heated in advance, may preferably be in the range from approximately 850 degrees C. to approximately 1150 degrees C. However, the temperature is not limited to this, and it is adjustable according to the kind of the metal material which is used in the ring material to manufacture the ring-rolled product with the high quality.

As shown in FIGS. 1 and 2, in the ring rolling, the mandrel roll 2 and the main roll 3, and the pair of axial rolls 4 and 5 rotate. In connection with rotating them, the ring material 1, which is heated in advance, rotates to one side (shown by the arrow F) in the ring circumferential direction around the axis 1a. The outer circumferential surface contact portion 3d of the circumferential surface 3a of the main roll 3 is induction-heated in the region immediately before inner and outer circumferential rolling by the induction heating element 6. Furthermore, in a state in which the ring material 1 rotates, an operation of pressing the ring material 1 in the ring radial direction by the mandrel roll 2, and the main roll 3 which is induction-heated, and an operation of pressing the ring material 1 in the ring axial direction by the pair of axial rolls 4 and 5 are repeated in this order. At this time, the mandrel roll 2 and the main roll 3 are relatively moved in the ring radial direction with the center of the ring material 1 in the radial direction as a reference so that the ring material 1 can be deformed to enlarge a diameter thereof. Furthermore, in the ring rolling, in the inner and outer circumferential rolling region, the outer circumferential surface 1c of the ring material 1 which contacts the outer circumferential surface contact portion 3d of the circumferential surface 3a of the main roll 3 being induction-heated, is efficiently restrained from being lowered in the temperature by the heat transfer.

In the ring rolling, the temperature of induction heating by the induction heating element 6 can be set such that the temperature of the outer circumferential surface contact portion 3d of the main roll 3 is within the range from approximately 300 degrees C. to the temperature of the ring material 1, which is heated in advance. The upper limit value can be set according to the material or the like of the main roll 3. In particular, the upper limit value can be set at the temperature which can prevent softening of the main roll 3. That is to say, the upper limit value can be less than the softening temperature in the material of the main roll 3. For example, when the main roll 3 is manufactured by using a hot-die steel which is specified by JIS Standards, the upper limit value may preferably be set to be less than the tempering temperature of the hot-die steel. More specifically, when the material of the circumferential surface 3a of the main roll 3 is a hot-die steel specified in JIS G4404 or an improved steel thereof, the upper limit value can be less than the tempering temperature, i.e., the softening temperature can be the tempering temperature. Furthermore, when strength and heat resistance are required of the material of the main roll 3, an Ni-base high heat-resistance alloy can be used, the upper limit value in this case can be less than the solution treatment (also referred to as "annealing") temperature, i.e., the softening temperature can be the solution treatment temperature. Furthermore, the temperature of induction heating by the induction heating element 6 can be adjusted so as to be capable of efficiently controlling the temperature distribution of the ring material 1 in the radial direction within the appropriate temperature range while the heat removal from the ring material 1 is restrained in this range. As an example, the temperature of induction heating by the induction heating element 6 can be adjusted such that the temperature distribution of the ring material 1 in the radial direction is made uniform.

<Operations and Effects>

Regarding the method for manufacturing a ring-rolled product according to the present Embodiment, in the inner and outer circumferential rolling region, the main roll 3 which is induction-heated, can efficiently restrain the outer circumferential surface 1c or the outer circumferential side region of the ring material 1 in which the temperature is easily reduced as compared with the inner circumferential side region of the ring material 1, from reducing in the temperature by the heat transfer so that the temperature distribution of the ring material 1 in the radial direction can be efficiently controlled within the appropriate temperature range in the inner and outer circumferential rolling region, and as a result, qualities such as the dimensional accuracy of the ring-rolled product which is to be manufactured, can be efficiently enhanced.

In particular, as compared with a case in which the ring material being deformed during ring rolling, is directly induction-heated by the induction heating element, when the main roll 3 is induction-heated by the induction heating element 7 as in the method for manufacturing a ring-rolled product according to the present Embodiment, a distance between the induction heating element 7 and an object to be induction-heated, i.e., the main roll 3, can be easily controlled so that the temperature at which induction heating is performed, can be easily controlled. In particular, as compared with a case in which the main roll is heated by a heating furnace, a gas burner, and/or the like, when the main roll 3 is induction-heated by the induction heating element 7 as in the method for manufacturing a ring-rolled product according to the present Embodiment, a working portion of the main roll 3 can be selectively heated, it can be heated quickly, and the temperature distribution of the ring material 1 can be efficiently controlled. Furthermore, the outer circumferential surface contact portion 3d of the circumferential surface 3a of the main roll 3, which contacts the outer circumferential surface 1c of the ring material 1, can be locally induction-heated so that the rotation axis 3b of the main roll 3 and a peripheral portion thereof can be prevented from being damaged by being excessively heated, without heating a portion other than the outer circumferential surface contact portion 3d in the circumferential surface 3a of the main roll 3 more than necessary.

According to the method for manufacturing the ring-rolled product according to the present Embodiment, to enhance the quality, such as the dimensional accuracy of the ring material 1, it is efficient to properly manage the temperature of the outer circumferential surface 1c of the ring material 1 which contacts the circumferential surface 3a of the main roll 3. The outer circumferential surface contact portion 3d of the circumferential surface 3a of the main roll 3 which is induction-heated, can efficiently restrain this outer circumferential surface 1c of the ring material 1 from decreasing in the temperature by the heat transfer in the inner and outer circumferential rolling region so that the temperature distribution of the ring material 1 in the radial direction can be efficiently controlled within the appropriate temperature range in the inner and outer circumferential rolling region.

In particular, in the ring rolling, main working of the ring material 1 is rolling by the main roll 3, and therefore, it is important to properly control the temperature of the outer circumferential surface 1c of the ring material 1 which contacts the main roll 3. Furthermore, in the ordinary rolling device, a volume of a die portion of the main roll 3 configured so as to form the ring material 1, tends to be larger than a volume of a die portion of the mandrel roll 2 which is configured so as to form the ring material 1. Since the main roll 3 is located on the outer circumferential side of the ring material 1, a circumferential length of the main roll 3 is longer than a circumferential length of the mandrel roll 2, and an area of a surface of the ring material 1 which contacts the main roll 3, tends to be larger than an area of a surface of the ring material 1 which contacts the mandrel roll 2. As a result, the quantity of the heat which escapes from the surface of the ring material 1 in contact with the main roll 3 tends to be greater than the quantity of the heat which escapes from the surface of the ring material 1 in contact with the mandrel roll 2. On the other hand, the outer circumferential surface 1c of the ring material 1 can be efficiently heated by the outer circumferential surface contact portion 3d of the circumferential surface 3a of the main roll 3, which is induction-heated, so that the quantity of the heat which escapes from the surface of the ring material 1 in contact with the main roll 3 in this way, can be supplemented.

First Specific Example of First Embodiment

As a First Specific Example of the First Embodiment of the present invention, the method for manufacturing a ring-rolled product can be further carried out as follows. In ring rolling of the production method, first of all, in the state in which the main roll 3 is rotated, the induction heating element 6 starts to induction-heat the outer circumferential surface contact portion 3d of the circumferential surface 3a of the main roll 3 in the region immediately before inner and outer circumferential rolling. After the start of induction heating, in a state in which each of the ring material 1 and the main roll 3 is rotated, an operation of pressing the ring material 1 in the ring radial direction by the mandrel roll 2, and the main roll 3 which is induction-heated, and an operation of pressing the ring material 1 in the ring axial direction by the pair of axial rolls 4 and 5 are repeated in this order. At this time, the mandrel roll 2 and the main roll 3 move in the ring radial direction with the center of the ring material 1 in the radial direction as the reference so that the ring material 1 can be deformed so as to enlarge a diameter thereof.

In the ring rolling, the induction heating is continuously performed in the period from the start of the induction heating to start of the rolling operation of the ring material 1, and it is also performed in the rolling of the ring material 1. However, the present invention is not limited to this, and the induction heating may be stopped temporarily before start of the rolling operation of the ring material, and may be restarted immediately before start of the rolling operation of the ring material, at the time of start thereof, or after start thereof. In this case, the stopping time period of the induction heating may be set within a range in which the temperature of the main roll can be maintained such that the quality such as the dimensional accuracy of the ring-rolled product, which is to be manufactured, can be efficiently enhanced. Furthermore, before the rolling operation of the ring material 1, the induction heating is performed such that a contact portion of the main roll 3 which contacts the ring material 1, i.e., the outer circumferential surface contact portion 3d of the circumferential surface 3a of the main roll 3 is the predetermined temperature (hereinafter, referred to as a "heating temperature before rolling"), during the predetermined time period (hereinafter, referred to as a "heating time period before rolling").

Furthermore, the heating time period before rolling and the heating temperature before rolling might be as follows. When considering a view in which the main roll 3 is sufficiently heated before the rolling operation of the ring material 1, and a view in which the induction heating is also performed during the rolling operation of the ring material 1 so that the quality of the ring-rolled product to be manufactured, can be efficiently enhanced, the heating time period before rolling can be approximately three minutes or more, and the heating temperature before rolling can be approximately 100 degrees C. or more, it can be preferably approximately 150 degrees C. or more, or it can be more preferably approximately 300 degrees C. or more. On the other hand, when considering a view in which softening of the main roll 3 is prevented, and a view in which the reduction in the production efficiency of the ring-rolled product has to be prevented, the heating time period before rolling can be approximately one hour or less, and the heating temperature before rolling can be less than the softening temperature in the material of the main roll 3. Specifically, when the material of the circumferential surface 3a of the main roll 3 is a hot-die steel specified by JIS G4404 or an improved steel thereof, the heating temperature before rolling can be less than the tempering temperature, i.e., the softening temperature can be the tempering temperature. Furthermore, when the strength and the heat resistance are required of the material of the main roll 3, an Ni high heat resistance alloy can be used, and the heating temperature before rolling in this case can be less than the solution treatment temperature, i.e., the softening temperature can be the solution treatment temperature.

According to the method for manufacturing a ring-rolled product according to the present Specific Example, the following effects can be obtained, in addition to the operation and the effects in the First Embodiment. That is to say, since the induction heating of the main roll 3 is carried out in the heating time period before rolling and the heating time period before rolling as described above, the reduction in the production efficiency of the ring-rolled product can be prevented. Meanwhile, the main roll 3 can be induction-heated before the rolling operation of the ring material 1 so as to make the induction heating of the main roll 3 in the rolling operation of the ring material 1 efficient, and as a result, the quality of the ring-rolled product which is to be manufactured, can be efficiently enhanced.

Second Specific Example of First Embodiment

As a Second Specific Example of the First Embodiment of the present invention, the method for manufacturing a ring-rolled product can be further carried out as follows. In the ring rolling of the production method, the outer circumferential surface contact portion 3d of the circumferential surface 3a of the main roll 3 is induction-heated at first in the region immediately before inner and outer circumferential rolling by the induction heating element 6 in the state in which the main roll 3 is rotated. The induction heating is performed so as to heat the outer circumferential surface contact portion 3d of the main roll 3 to the heating temperature before rolling in the heating time period before rolling. After the induction heating is stopped, the operation of rolling the ring material 1 in the ring radial direction by the mandrel roll 2, and the main roll 3 which is induction-heated, and the operation of pressing the ring material 1 in the ring axial direction by the axial rolls 4 and 5 are repeated in this order, in the state in which each of the ring material 1 and the main roll 3 is rotated. At this time, the mandrel roll 2 and the main roll 3 move in the ring radial direction with the center of the ring material 1 in the radial direction as the reference so that the ring material 1 can be deformed so as to enlarge the diameter thereof.

The heating time period before rolling and the heating temperature before rolling in the induction heating might be as follows. When considering a view in which the main roll 3 is sufficiently heated before the rolling operation of the ring material 1 so that the quality of the ring-rolled product to be manufactured, can be efficiently enhanced, and a view in which the induction heating is stopped before the rolling operation of the ring material 1, the heating time period before rolling can be approximately 15 minutes or more, or it is preferably approximately 30 minutes or more, and the heating temperature before rolling can be approximately 300 degrees C. or more, or it may preferably be approximately 400 degrees C. or more. Meanwhile, when considering a view in which softening of the main roll 3 is prevented, and a view in which the reduction in the production efficiency of the ring-rolled product has to be prevented, the heating time period before rolling can be approximately two hours or less, or it may preferably be approximately one hour or less, and the heating temperature before rolling can be less than the softening temperature in the material of the main roll 3. Specifically, when the material of the circumferential surface 3a of the main roll 3 is a hot-die steel specified by JIS G4404 or an improved steel thereof, the heating temperature before rolling can be less than the tempering temperature, i.e., the softening temperature can be the tempering temperature. Furthermore, when the strength and the heat resistance are required of the material of the main roll 3, an Ni high heat resistance alloy can be used, and the heating temperature before rolling in this case can be less than the solution treatment temperature, i.e., the softening temperature can be the solution treatment temperature.

According to the method for manufacturing a ring-rolled product according to the present Specific Example, the following operations and effects can be obtained in addition to the operations and effects in the First Embodiment. That is to say, since the induction heating of the main roll 3 is carried out in the heating time period before rolling and the heating time period before rolling as described above, the reduction in the production efficiency of the ring-rolled product can be prevented. Meanwhile, the main roll 3 can be induction-heated before the rolling operation of the ring material 1 to maintain the temperature of the main roll 3 appropriately in the rolling operation of the ring material 1 in the state in which induction heating is stopped, and as a result, the quality of the ring-rolled product which is to be manufactured, can be efficiently enhanced.

Second Embodiment

A method for manufacturing a ring-rolled product according to a Second Embodiment of the present invention will be described hereinafter. Note that the method for manufacturing a ring-rolled product according to the present Embodiment may preferably be used in a case in which an edge-shaped portion is formed on an outer circumferential side region of the ring material 1.

<Rolling Device>

Figure 6:
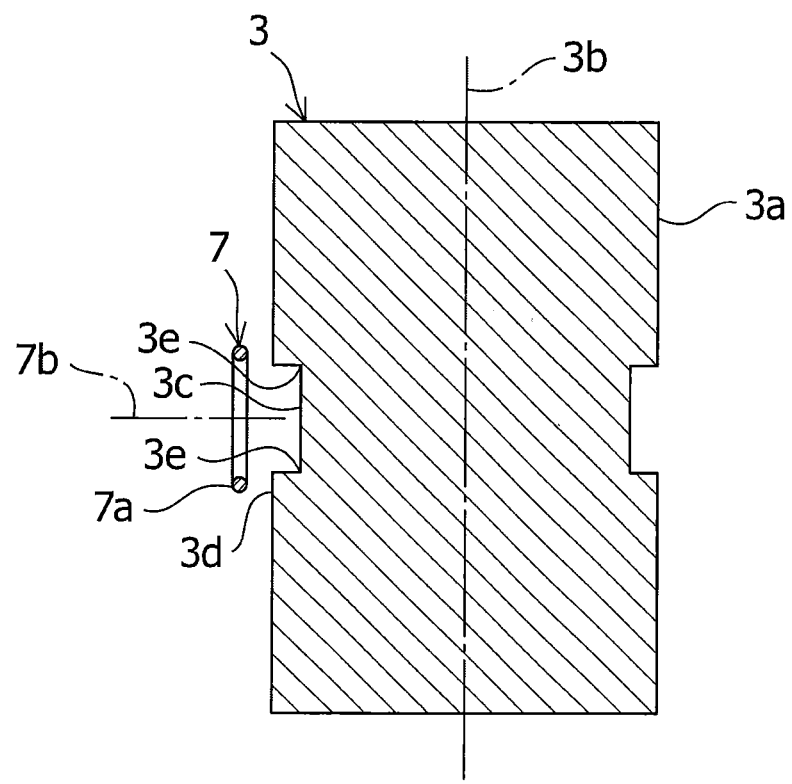
FIG. 6 is a diagram schematically showing a cross-section of a main roll and an induction heating coil in a Second Embodiment of the present invention, which is cut along a line corresponding to line B-B in FIG. 2.
Figure 7:
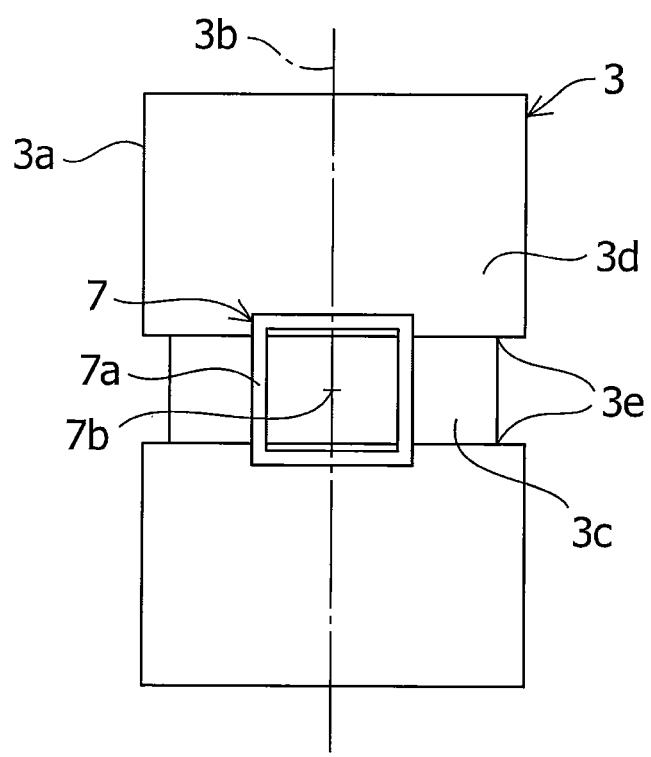
FIG. 7 is a front view schematically showing the main roll and the induction heating coil in the Second Embodiment of the present invention.

As shown in FIGS. 6 and 7, a rolling device which is used in the present Embodiment, has an induction heating element 7, which will be described hereinafter instead of the induction heating element 6 of the First Embodiment. However, regarding the other configuration, the rolling device is the same as the rolling device which is used in the First Embodiment.

<Induction Heating Element>

As shown in FIGS. 6 and 7, the induction heating element 7 of the present Embodiment is the same as the induction heating element 6 of the First Embodiment except for the following features. For a contact relationship between the protruded portion 1f of the outer circumferential surface 1c of the ring material 1 and the recessed portion 3c of the circumferential surface 3a of the main roll 3, refer to FIG. 3. Regarding features different from the First Embodiment, in the induction heating element 7, an induction heating coil 7a is apart from the circumferential surface 3a of the main roll 3 which contacts the outer circumferential surface 1c of the ring material 1, in the ring radial direction, and is apart from the recessed portion 3c (refer to FIG. 3) of the main roll 3 which contacts the protruded portion 1f of the ring material 1, in the ring radial direction, and furthermore, a direction of a winding axis 7b of a winding wire is disposed so as to be directed to the recessed portion 3c of the main roll 3. End portions of the induction heating coil 7a in the ring axial direction thereof are disposed so as to be apart from the edge-shaped contact portions 3e (refer to FIG. 3) of the recessed portion 3c of the main roll 3 which contact the edge-shaped portions 1g formed on the protruded portion 1f of the ring material 1, in the ring axial direction. In FIGS. 6 and 7, as an example, the end portions of the induction heating coil 7a in the ring axial direction thereof are disposed between the edge-shaped contact portions 3e and end portions in the ring axial direction in the outer circumferential surface contact portion 3d. The induction heating element 7 can induction-heat the edge-shaped contact portions 3e of the main roll 3 in the region immediately before inner and outer circumferential rolling, and furthermore, the edge-shaped portions 1g (refer to FIG. 3) of the ring material 1 which contact the edge-shaped contact portions 3e of the circumferential surface 3a of the main roll 3 which is induction heated, can be predominantly heated in the inner and outer circumferential rolling region.

However, the present invention is not limited to this, and the rolling device may have a plurality of induction heating elements to facilitate the temperature control of the ring material more. Furthermore, when the outer circumferential side region of the ring material has at least one of: one or more protruded portions; and one or more recessed portions, the edge-shaped contact portions on the circumferential surface of the main roll which contact the edge-shaped portions formed on the outer circumferential side region of the ring material, can be configured so as to be induction-heated predominantly. Furthermore, if the edge-shaped contact portions of the main roll can be induction-heated, the direction of the winding axis of the induction heating coil may be directed to other portions than the recessed portion of the main roll. If the edge-shaped contact portions of the main roll can be induction-heated, the induction heating element may have a magnetic core on which the induction heating coil is wound, and in this case, the edge-shaped contact portions of the main roll for the ring material are induction-heated on the line of the magnetic flux which is generated from the magnetic core.

In FIG. 7, an outer perimeter portion of the induction heating coil 7a is formed into a substantially quadrangular shape when seen from the direction of the winding axis 7b. However, the outer perimeter portion of the induction heating coil is not limited to this, and it can be formed into a substantially circular shape, a substantially elliptical shape, a substantially polygonal shape other than the substantially quadrangular shape, and/or the like when seen from the direction of the winding axis. Furthermore, the number of turns of the induction heating coil 7a may preferably be more than one as necessary for the density of the magnetic lines of the force in the range which enables production of the coil.

<Method for Manufacturing Ring-Rolled Product>

The method for manufacturing the ring-rolled product according to the present Embodiment includes ring rolling as follows by this rolling device. In the ring rolling, the mandrel roll 2, the main roll 3, and the pair of axial rolls 4 and 5 rotate. In connection with rotating these rolls, the ring material 1 which is heated in advance, rotates to one side (shown by the arrow F in FIG. 7) in the ring circumferential direction around the axis 1a, as in the First Embodiment. By the induction heating element 7, the edge-shaped contact portions 3e of the circumferential surface 3a of the main roll 3 are induction-heated in the region immediately before inner and outer circumferential rolling. Furthermore, in the state in which the ring material 1 rotates, an operation of pressing the ring material 1 in the ring radial direction by the mandrel roll 2, and the main roll 3 which is induction-heated, and an operation of pressing the ring material 1 in the ring axial direction by the pair of axial rolls 4 and 5 are repeated in this order. At this time, one or both of the mandrel roll 2 and the main roll 3 moves or move in the ring radial direction with the center of the ring material 1 in the radial direction as a reference so that the ring material 1 can be deformed so as to enlarge a diameter thereof. Furthermore, in the ring rolling, the edge-shaped portions 1g on the outer circumferential surface 1c of the ring material 1 which contact the edge-shaped contact portions 3e on the circumferential surface 3a of the main roll 3 which is induction-heated, are heated in the inner and outer circumferential rolling region.

In the ring rolling, the temperature of induction heating by the induction heating element 7 can be set such that the temperature of edge-shaped contact portion 3e of the main roll 3 is within the range from approximately 300 degrees C. to the temperature of the ring material 1 which is heated in advance. The upper limit value can be set according to the material of the main roll 3 or the like. In particular, the upper limit value can be set at the temperature which can prevent softening of the main roll 3. For example, when the main roll 3 is manufactured by using a hot-die steel which is specified by JIS Standards, the upper limit value may preferably be set to be less than the tempering temperature of the hot-die steel. Furthermore, the temperature of induction heating by the induction heating element 7 can be adjusted so as to be capable of efficiently controlling the temperature distribution of the ring material 1 in the radial direction within the appropriate temperature range while restraining heat removal from the ring material 1, in this range. As an example, the temperature of the induction heating by the induction heating element 7 can be adjusted such that the temperature distribution of the ring material 1 in the radial direction is made uniform.

<Operations and Effects>

According to the method for manufacturing the ring-rolled product according to the present Embodiment, the edge-shaped portions 1g of the outer circumferential side region of the ring material 1 in which the temperature can be particularly reduced easily, can be efficiently heated by the edge-shaped contact portions 3e on the circumferential surface 3a of the main roll 3 which are induction-heated, in the inner and outer circumferential rolling region, so that the temperature distribution of the ring material 1 in the radial direction can be efficiently controlled so as to be within the appropriate temperature range in the inner and outer circumferential rolling region. Furthermore, the edge-shaped contact portions 3e on the circumferential surface 3a of the main roll 3 which contact the edge-shaped portions 1g in the outer circumferential side region of the ring material 1 can be locally induction-heated so that the rotation axis 3b of the main roll 3 and the peripheral portion thereof can be prevented from being damaged by being excessively heated, without heating the portions other than the edge-shaped contact portions 3e in the circumferential surface 3a of the main roll 3 more than necessary. Furthermore, the present Embodiment can provide the operations and the effects which are the same as those in the First Embodiment except for the above operations and effects obtained instead of those based on induction-heating the outer circumferential surface contact portion 3d of the main roll 3.

First and Second Specific Examples of Second Embodiment

As First and Second Specific Examples of the Second Embodiment of the present invention, the methods for manufacturing a ring-rolled product can be made the same as the First and Second Specific Examples of the First Embodiment except for the feature that the edge-shaped contact portions 3e of the main roll 3 are induction-heated by the induction heating element 7 instead of the outer circumferential surface contact portion 3d of the main roll 3 being induction-heated by the induction heating element 6. The methods for manufacturing ring-rolled products according to these First and Second Specific Examples cam provide the effects which are the same as those in the First and Second Specific Examples of the First Embodiment except for the effect based on the edge-shaped contact portions 3e of the main roll 3 being induction-heated by the induction heating element 7, obtained instead of that based on the outer circumferential surface contact portion 3d of the main roll 3 being induction-heated by the induction heating element 6.

Although the Embodiments of the present invention are described above, the present invention is not limited to the aforementioned Embodiments. The present invention can be modified and changed based on the technical concept.

REFERENCE SIGNS LIST

1 Ring material
1a Axis
1b Inner circumferential surface
1c Outer circumferential surface
1d, 1e End surface in axial direction
1g Edge-shaped portion
1g Mandrel roll
3 Main roll
3a Circumferential surface
3d Outer circumferential surface contact portion
3e Edge-shaped contact portion
4, 5 Axial roll 6, 7 Induction heating element
6a, 7a Induction heating coil
6b, 7b Winding axis
θ Angle
F, R1, R2, R3, R4 Arrow

The invention claimed is:

1. A method for manufacturing a ring-rolled product, the method forming a ring-rolled product from a ring material by using a mandrel roll and a main roll, the mandrel roll and the main roll being configured so as to contact inner and outer circumferential surfaces of the ring material respectively in a state in which the ring material is rotated in a circumferential direction thereof, the mandrel roll and the main roll being configured so as to press the ring material in a radial direction thereof, comprising:

a step of rolling the ring material, this step including an operation of induction-heating a contact portion of a circumferential surface of the main roll which contacts the outer circumferential surface of the ring material by at least one induction heating element to a temperature of not less than 100 degrees C. and less than the softening temperature of a material of the main roll, and rolling the ring material between the mandrel roll, and the main roll which is induction-heated.

2. The method for manufacturing a ring-rolled product according to claim 1, wherein
in the step of rolling, the main roll is induction-heated during rolling of the ring material.

3. The method for manufacturing a ring-rolled product according to claim 2, wherein
in the step of rolling, the induction heating of the main roll is started before start of the rolling of the ring material, and
the induction heating of the main roll is performed so as to heat the contact portion of the main roll to a temperature of not less than 100 degrees C. and less than the softening temperature of a material of the main roll, in a period from three minutes to two hours in a stage before start of the rolling of the ring material.

4. The method for manufacturing a ring-rolled product according to claim 1, wherein
in the step of rolling, the main roll is induction-heated by the at least one induction heating element so as to heat the make a contact portion of the main roll to a temperature of not less than 300 degrees C. and less than the softening temperature of the material of the main roll, in a period from 15 minutes to two hours, and the rolling of the ring material is carried out after stop of the induction heating.

5. The method for manufacturing a ring-rolled product according to claim 1, wherein
in the step of rolling, an edge-shaped contact portion of a circumferential surface of the main roll which contacts an edge-shaped portion formed on an outer circumferential side region of the ring material, is induction-heated.

* * * * *

UNITED STATES PATENT AND TRADEMARK OFFICE
CERTIFICATE OF CORRECTION

PATENT NO. : 11,077,481 B2
APPLICATION NO. : 15/779772
DATED : August 3, 2021
INVENTOR(S) : Murai et al.

Page 1 of 1

It is certified that error appears in the above-identified patent and that said Letters Patent is hereby corrected as shown below:

In the Claims

Column 18, Line 16, Claim 4: Please correct "the make a contact" to read -- the contact --

Signed and Sealed this
Sixteenth Day of August, 2022

Katherine Kelly Vidal
*Director of the United States Patent and Trademark Office*